Feb. 18, 1964  H. C. McGINTY ETAL  3,121,784
GAS SHIELDED ARC WELDING TORCH NOZZLE
Filed March 2, 1962
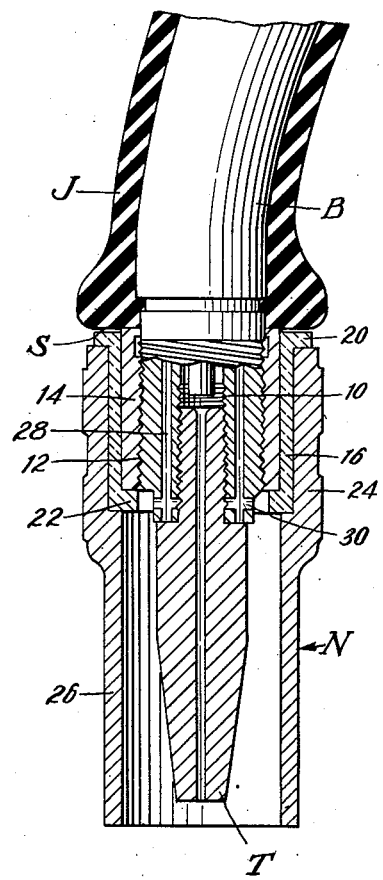
INVENTORS
HARRY C. Mc GINTY
THADDEUS J. WOJCIAK
BY Richard S. Sherere
ATTORNEY

United States Patent Office 3,121,784
Patented Feb. 18, 1964

3,121,784
GAS SHIELDED ARC WELDING TORCH NOZZLE
Harry C. McGinty, Belleville, and Thaddeus J. Wojciak, Clark, N.J., assignors to Union Carbide Corporation, a corporation of New York
Filed Mar. 2, 1962, Ser. No. 177,097
5 Claims. (Cl. 219—75)

This invention relates to gas shielded arc welding torch nozzle, and more particularly, to a metal-insulation-sandwich construction of such nozzles.

Such nozzles have been made of high thermal conductivity copper, since this material was not susceptible to mechanical breakage, and when water-cooled would withstand high temperatures at the current capacities required. However, nozzles made of this material have to be insulated from the current carrying elements of the torch, so as to prevent double arcing when the nozzle comes in close proximity to the workpiece and to eliminate an electric shock hazard to the welding operator. This necessarily added undesirability to the bulk and size of the torch and also complicated torch design.

More recently, gas cups made of ceramics such as those described in Hill, 2,992,320, have been used, but these cups are highly susceptible to failure from both thermal and mechanical shock. Also, the operating level for these cups is not nearly as high as for metal nozzles. These problems are especially troublesome in consumable electrode electric arc welding where arc radiation is considerably greater and where torches receive far more mechanical abuse than in nonconsumable electrode welding.

The main objects of the present invention are to incorporate the advantages of both metal and ceramic cups and eliminate their disadvantages, and to provide a metal nozzle incorporating its own insulating means, thus permitting it to be mounted directly on the current carrying member of the torch.

Other objects are to simplify torch design, permitting smaller torches to carry higher current capacities, to eliminate the need for a water-cooled or air-cooled nozzle insulator, to eliminate the need for water-cooling to the nozzle, and to provide better nozzle concentricity and more rigid mounting to the torch and to increase the thread life on the torch body.

According to the present invention, a metal-insulation sandwich construction is provided by an external metal nozzle jacket, an intermediate dielectric insulator sleeve inside said jacket, and an internally threaded metal member inside said sleeve adapted to be screwed onto the current carrying torch body.

Preferably, the nozzle jacket is made of a high thermal conductivity copper or copper alloy; the internal metal threaded member is brass or a metal exhibiting good bearing properties for the thread; and the dielectric is a high temperature plastic which is bonded to the metal parts by a high temperature epoxy resin or ceramic cement.

In the drawing, the single figure is a section through a torch provided with a gas directing nozzle according to be preferred embodiment of the present invention.

The torch shown in FIG. 1 is provided with a current carrying torch body B, the end of which has a socket provided with an internal thread 10, and the outside provided with an external thread 12. A contact tip T is threaded into the torch body B, engaging internal thread 10. The torch body B is covered with an insulating sheath J which terminates just above external thread 12 in a flat surface S which is normal to the torch axis. External thread 12 is a double lead thread to facilitate quick removal and assembly of the nozzle.

The gas directing nozzle comprises a brass internal member 14 which is threaded to mate with external thread 12 on the torch body B. A dielectric insulator 16, consisting of a silicone-resin-glass laminate is placed over the brass internal member 14 and is bonded to it by a high temperature epoxy resin. A copper nozzle jacket N is then fitted over insulator 16 and is also bonded with a high temperature epoxy-resin. The insulator 16 is made with an external flange 20 at one end and an internal flange 22 at the other end. These flanges serve to assist in accurately locating both the nozzle jacket N and the internal member 14 spacially with respect to insulator 16 during assembly.

The nozzle jacket N has a head socket 24 at the top, which receives the insulator 16, and a skirt 26 depending therebelow surrounding the contact tip T. The torch body B has longitudinal gas supply passages 28 between the socket 10 and the outer thread 12. The lower ends of the passages 28 are closed by the shoulder of the contact tip T. Radial drillings 30 conduct the gas from the passages 28 to the annular space inside the skirt 26 and outside of the contact tip T, which space forms the annular stream to shield the arc.

When the nozzle assembly is threaded onto the torch, the end of the brass internal member 14 abuts against surface S of insulating sheath J so that compressive loading is applied to the metal part rather than to the insulator 16. Frictional forces between the internal member 14 and surface S tend to lock the nozzle in position and also provides an adequate gas seal.

A major part of the solution to the problem lay in finding a suitable insulating material. The properties required in such an insulating material are, in addition to good dielectric strength, the ability to withstand high temperatures, and good resistance to mechanical shock and loading. The material found most suitable was a silicone-resin-glass plastic laminate. This material can withstand temperatures of 400 degs. F. continuously and much higher temperatures in intermittent service.

It has been found that nozzles made with this insulating material will stand up with nozzle temperatures up to 1000 degs. with no water-cooling of the nozzle. Sufficient air-cooling is achieved through the copper nozzle jacket. This permits the use of welding currents up to 275 amperes with consumable electrode electric arc welding. Current rating would be proportionately higher for nonconsumable electrode welding. In addition, adequate mechanical strength is achieved since it has been possible to subject nozzles made with this material to torques up to 480 in. lbs. without failure. No ceramic nozzle to date has yet been made with can stand up under these service conditions.

Other insulating compounds are superior to the silicone-resin-glass plastic laminate. These include phenolic-asbestos compounds, silicone-glass compounds, synthetic micas, and moldable ceramics. The phenol-asbestos compounds and the silicon-glass compounds may be either molded or laminated. These materials can withstand temperatures up to five times higher than the silicone-resin-glass plastic laminate. In addition, they provide their own bond and thus need no epoxy-resin or ceramic cement to cement the assembly together. These are to be preferred over the silicone-resin-glass plastic laminate since they will permit considerably higher current capacities and lower unit costs after initial expeditures for necessary molds.

The cost of shielding nozzles made according to this invention may be slightly higher than that for either all-metal shielding nozzles or ceramic cups. However, this additional cost is offset by simplifying the torch design. Not only is a separate torch part eliminated, the nozzle insulating bushing, but the water-cooling system is also simplified, since cooling need be provided only to the contact tube.

Another advantage to be derived from this invention is that ability to withstand thermal and mechanical shock is provided as in the case of metal nozzles, while achieving the insulation properties of ceramic nozzles. Also, like a ceramic cup, the inventive nozzle can be threaded directly to the current carrying member but in the present nozzle, an additional advantage is gained. The mating of the nozzle thread to the torch body thread is metal-to-metal rather than ceramic-to-metal. This reduces wear on the torch body thread, thus minimizing maintenance and increasing the life of the torch.

What is claimed is:

1. For use in a gas shielded arc torch comprising a current carrying torch body having external threads, a gas directing nozzle comprising an external metal nozzle jacket, an intermediate dielectric insulator sleeve permanently secured inside said jacket, and an internally threaded metal member inside said dielectric insulator sleeve adapted to mesh with said torch body external threads for attaching the nozzle directly to said current carrying torch body, whereby said jacket, said insulator sleeve, and said inside threaded metal member together form a one piece structure which may be removed and replaced as a unit.

2. Gas directing nozzle as claimed in claim 1, in which said dielectric insulator sleeve is constructed of a material selected from the group consisting of silicone-resin-glass plastic laminates, molded or laminated phenolic-asbestos compounds, molded or laminated silicone-glass compounds, synthetic micas, and moldable ceramics.

3. Gas directing nozzle as claimed in claim 1, in which said dielectric insulator sleeve is constructed of silicone-resin-glass plastic laminate and is bonded to said internal metal member and to said metal nozzle jacket by a high temperature epoxy-resin or suitable adhesive.

4. Gas directing nozzle as claimed in claim 1, in which said external metal nozzle jacket has an internal annular shoulder, and said dielectric insulator sleeve has an internal flange at the bottom fitting under said internal metal member and over said annular shoulder in said jacket.

5. Gas directing nozzle as claimed in claim 4, in which said current carrying torch body is covered with an insulating shield which terminates above said external threads, and said dielectric insulator sleeve has an external flange at the top facing said shield, and the top of said internally threaded metal member abuts the bottom of said shield.

References Cited in the file of this patent

UNITED STATES PATENTS

| | | |
|---|---|---|
| 2,952,766 | Craig et al. | Sept. 13, 1960 |
| 2,992,320 | Hill | July 11, 1961 |